US011680809B2

(12) United States Patent
Kanayama

(10) Patent No.: US 11,680,809 B2
(45) Date of Patent: Jun. 20, 2023

(54) IN-VEHICLE INFORMATION DEVICE AND METHOD FOR CONTROLLING IN-VEHICLE INFORMATION DEVICE

(71) Applicant: Mitsubishi Electric Corporation, Tokyo (JP)

(72) Inventor: Yozo Kanayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 51 days.

(21) Appl. No.: 17/616,923

(22) PCT Filed: Jul. 5, 2019

(86) PCT No.: PCT/JP2019/026771
§ 371 (c)(1),
(2) Date: Dec. 6, 2021

(87) PCT Pub. No.: WO2021/005632
PCT Pub. Date: Jan. 14, 2021

(65) Prior Publication Data
US 2022/0326027 A1    Oct. 13, 2022

(51) Int. Cl.
*G01C 21/34*    (2006.01)
*G01C 21/36*    (2006.01)
(Continued)

(52) U.S. Cl.
CPC ......... *G01C 21/3461* (2013.01); *B60W 50/14* (2013.01); *B60W 60/0057* (2020.02);
(Continued)

(58) Field of Classification Search
CPC ............ G01C 21/3461; G01C 21/3415; G01C 21/3617; G01C 21/3697; B60W 60/0057;
(Continued)

(56) References Cited

U.S. PATENT DOCUMENTS 9,501,878 B2 * 11/2016 Palmer ..................... G07C 5/12
10,796,177 B1 * 10/2020 Yoshizaki ............. B60W 50/14
(Continued)

FOREIGN PATENT DOCUMENTS

EP    3330825 A1 *  6/2018  .......... G05D 1/0088
EP    3357778 A1 *  8/2018  .......... B60W 30/085
(Continued)

OTHER PUBLICATIONS

Abdul et al., "Adaptive Route Planning in Spatial Road Networks,"2016, Publisher: IEEE.*
(Continued)

*Primary Examiner* — Tuan C To
(74) *Attorney, Agent, or Firm* — Birch, Stewart, Kolasch & Birch, LLP

(57) ABSTRACT

A content information acquiring unit acquires content information including a watching-or-listening time period of content that an occupant of a vehicle desires to watch or listen to. A position information acquiring unit acquires position information of the vehicle. A road information acquiring unit acquires road information including information regarding an autonomous driving section and a manual driving section. A route setting unit sets a route in which the vehicle travels through the autonomous driving section in the watching-or-listening time period of the content on the basis of the content information, the position information, and the road information. A notification unit notifies the occupant of the vehicle of the route set by the route setting unit.

9 Claims, 6 Drawing Sheets

(51) Int. Cl.
  *B60W 50/14* (2020.01)
  *B60W 60/00* (2020.01)
(52) U.S. Cl.
  CPC ..... *G01C 21/3415* (2013.01); *G01C 21/3617* (2013.01); *G01C 21/3697* (2013.01); *B60W 2050/143* (2013.01); *B60W 2050/146* (2013.01)
(58) Field of Classification Search
  CPC .......... B60W 50/14; B60W 2050/143; B60W 2050/146
  USPC ........................................................ 701/425
  See application file for complete search history.

(56) References Cited

U.S. PATENT DOCUMENTS

| | | | | |
|---|---|---|---|---|
| 11,541,889 | B2* | 1/2023 | Um | B60W 50/10 |
| 11,550,317 | B2* | 1/2023 | Lee | B60W 50/08 |
| 2016/0355190 | A1* | 12/2016 | Omi | B60W 30/12 |
| 2017/0308094 | A1 | 10/2017 | Abe et al. | |
| 2017/0315771 | A1* | 11/2017 | Kerr | H04N 7/181 |
| 2018/0157256 | A1* | 6/2018 | Oniwa | B60W 10/08 |
| 2018/0157262 | A1 | 6/2018 | Ao et al. | |
| 2019/0039618 | A1* | 2/2019 | Mori | B60W 50/0098 |
| 2019/0351916 | A1* | 11/2019 | Mangal | B60W 50/14 |
| 2019/0394513 | A1* | 12/2019 | Shin | H04N 21/44004 |
| 2020/0364476 | A1* | 11/2020 | Yoshizaki | G06V 20/56 |
| 2020/0378778 | A1* | 12/2020 | Glazberg | B60T 8/17 |

FOREIGN PATENT DOCUMENTS

| | | | |
|---|---|---|---|
| JP | 2006-267060 A | 10/2006 | |
| JP | 2013-36776 A | 2/2013 | |
| JP | 2014-20921 A | 2/2014 | |
| JP | 2017-198505 A | 11/2017 | |
| JP | 2018-91711 A | 6/2018 | |
| WO | WO-2018211488 A1 * | 11/2018 | ........ B60W 60/0011 |
| WO | WO-2019017215 A1 * | 1/2019 | ............ B60K 35/00 |

OTHER PUBLICATIONS

Wen et al., "A Multimedia System for Route Sharing and Video-Based Navigation," 2006, Publisher: IEEE.*
Japanese Notice of Reasons for Refusal for Japanese Application No. 2021-530332, dated Jul. 13, 2022, with an English translation.
International Search Report for PCT/JP2019/026771 dated Oct. 8, 2019.
Written Opinion of the International Searching Authority for PCT/JP2019/026771 dated Oct. 8, 2019.

* cited by examiner

FIG. 6

!!Notice!!
Arrival at the Content Available Area will be Delayed by 40 Minutes.
You may not be able to Watch or Listen to the Content You would like to Watch or Listen to (1) Continue Driving along This Route
(2) Search for Nearby Available Parking Areas
(3) Search for Another Route Select One of (1) to (3)

IN-VEHICLE INFORMATION DEVICE AND METHOD FOR CONTROLLING IN-VEHICLE INFORMATION DEVICE

TECHNICAL FIELD

The present invention relates to an in-vehicle information device and a method for controlling an in-vehicle information device.

BACKGROUND ART

Autonomous driving technology for enabling autonomous driving of vehicles includes full automation that does not require any driving operation by an occupant under any environment, and partial automation that enables autonomous driving under a specific environment but requires manual driving by an occupant depending on situations. For example, full automation corresponds to the autonomous driving level 4 (advanced autonomous driving) and the autonomous driving level 5 (full autonomous driving) from among autonomous driving levels 0 to 5 defined by Society of Automotive Engineers (SAE), and autonomous driving requiring manual driving corresponds to the autonomous driving level 3 (conditional autonomous driving) or lower.

Self-driving vehicles that have been developed in recent years have the latter autonomous driving technology, and thus may be switched from autonomous driving to manual driving. Therefore, a conventional in-vehicle information device searches for a route on which the vehicle can travel, automatically performs travel control of the vehicle in a section of the searched route where autonomous driving is possible, and allows an occupant to perform a driving operation in a section where the autonomous driving is not possible (see, for example, Patent Literature 1). As described above, in preparation for switching from autonomous driving to manual driving, it is required that an occupant who is in a physical and mental condition adequate to drive the vehicle and who carries a driver's license be seated in the driver's seat.

CITATION LIST

Patent Literature

Patent Literature 1: JP 2018-91711 A

SUMMARY OF INVENTION

Technical Problem

The occupant seated in the driver's seat can enjoy watching television programs or listening to music without worrying about driving during autonomous driving. However, in the conventional in-vehicle information device, it is not considered whether or not the vehicle travels through a section where autonomous driving is possible in a time period over which the occupant seated in the driver's seat desires to watch a television program or the like. Therefore, when, for example, the route on which the vehicle is traveling is switched from a section having the automation level 4 or higher to a section having the automation level 3 or lower while the occupant seated in the driver's seat is watching a television program, the occupant has to stop watching the television program.

The present invention is accomplished to address the above problem, and an object of the present invention is to search for a route in which a vehicle travels through an autonomous driving section in a time period over which an occupant desires to watch or listen to content such as a television program, the autonomous driving section requiring no manual driving.

Solution to Problem

An in-vehicle information device according to the present invention includes: processing circuitry to acquire content information including a watching-or-listening time period of content that an occupant of a vehicle desires to watch or listen to; to acquire position information of the vehicle; to acquire road information including information regarding an autonomous driving section and a manual driving section; to set a route on which the vehicle travels and in which the vehicle travels through the autonomous driving section in the watching-or-listening time period of the content, on the basis of the content information acquired the position information acquired, and the road information acquired; and to notify the occupant of the vehicle of the route set.

Advantageous Effects of Invention

According to the present invention, it is possible to search for a route in which the vehicle travels through an autonomous driving section in a time period over which the occupant desires to watch or listen to content such as a television program, the autonomous driving section requiring no manual driving.

BRIEF DESCRIPTION OF DRAWINGS

FIG. 6 is a diagram illustrating an example of a screen displayed on the display unit by the notification unit when the arrival at an entrance of the autonomous driving section is delayed in the first embodiment.

DESCRIPTION OF EMBODIMENTS

In order to describe the present invention in more detail, a mode for carrying out the present invention will now be described with reference to the accompanying drawings.

First Embodiment

Figure 1:
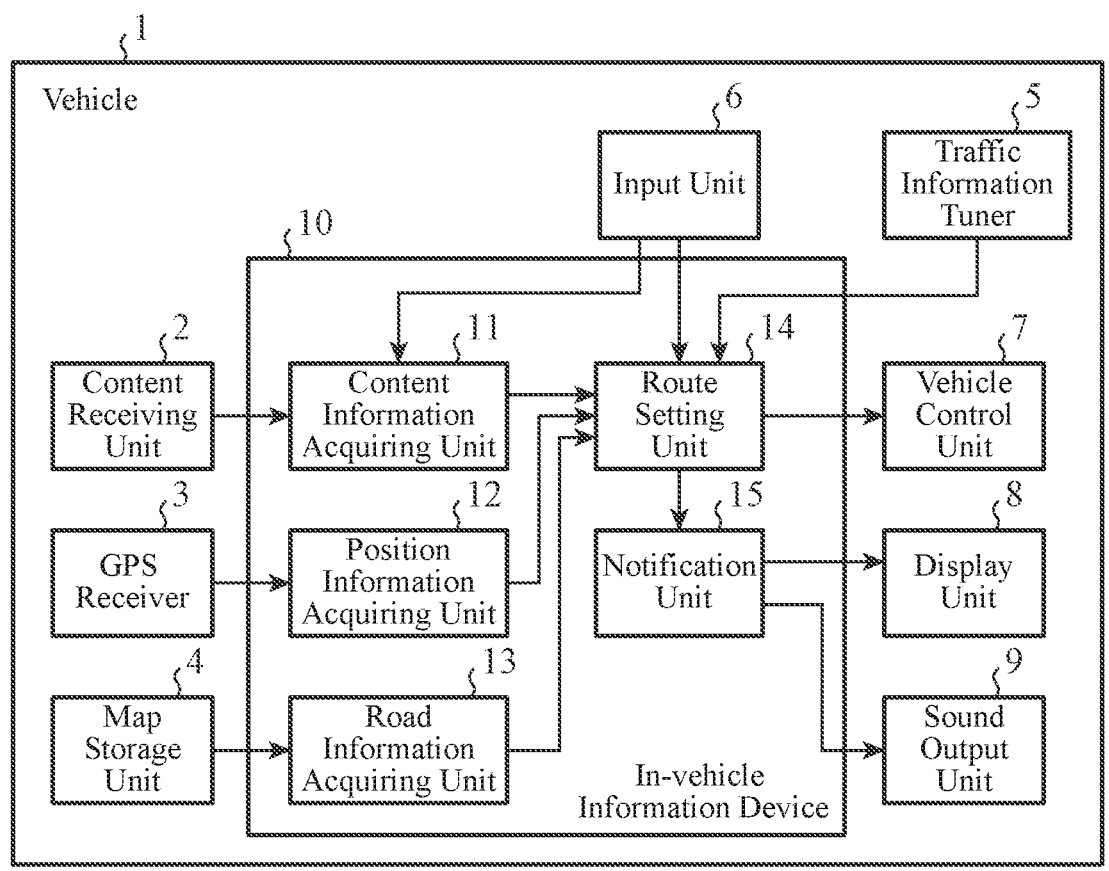
FIG. 1 is a block diagram illustrating a configuration example of an in-vehicle information device according to a first embodiment.

FIG. 1 is a block diagram illustrating a configuration example of an in-vehicle information device 10 according to a first embodiment. The in-vehicle information device 10 searches for a route of a vehicle 1 from a departure place to a destination and notifies an occupant of the vehicle 1 of the route. The in-vehicle information device 10 includes a content information acquiring unit 11, a position information acquiring unit 12, a road information acquiring unit 13, a route setting unit 14, and a notification unit 15. Further, the in-vehicle information device 10 is connected to a content receiving unit 2, a global positioning system (GPS) receiver 3, a map storage unit 4, a traffic information tuner 5, an input unit 6, a vehicle control unit 7, a display unit 8, and a sound output unit 9.

The content receiving unit 2 receives content to be watched or listened to by the occupant of the vehicle 1 and content information such as a title and a watching-or-listening time period of the content. The content receiving unit 2 outputs the received content information to the content information acquiring unit 11.

In the first embodiment, the occupant of the vehicle 1 indicates an occupant seated in a driver's seat.

For example, in a case where the content is a television program or radio program, the content receiving unit 2 includes a television tuner or a radio tuner. In addition, in a case where the content is provided by a service utilizing the Internet such as Wi-Fi (registered trademark) or vehicle to everything (V2X) (for example, in a case where the content is an Internet program, an Internet game, or a web meeting), the content receiving unit 2 includes a wireless communication device.

Note that the content received by the content receiving unit 2 is displayed on the display unit 8 or is output by sound from the sound output unit 9, but the configuration regarding this respect is not illustrated, and the description thereof will be omitted.

The GPS receiver 3 receives radio waves from GPS satellites and measures the position of the vehicle 1 using the received radio waves. The GPS receiver 3 outputs position information indicating the position of the vehicle 1 to the position information acquiring unit 12.

The map storage unit 4 stores map information. Note that the map storage unit 4 may be provided in the vehicle 1 or may be provided in an external server or the like. The map information is used for route search by the route setting unit 14. The map information includes road information and information regarding an available parking area where the vehicle can be parked or stopped. The road information includes, for example, nodes such as intersections and road links that are sections connecting the nodes. Each road link is classified as a corresponding one of a manual driving section and an autonomous driving section. In the first embodiment, it is assumed that the manual driving section is a road classified as the automation level 3 (conditional driving automation) or lower among automation levels 0 to 5 described above. In addition, the autonomous driving section is assumed to be a road classified as the automation level 4 (high driving automation) or the automation level 5 (full driving automation). At the automation level 4 or higher, the driving operation by the occupant is unnecessary, whereas at the automation level 3 or lower, the driving operation by the occupant may be necessary. Therefore, when the vehicle 1 travels through the manual driving section having the automation level 3 or lower, it is necessary that an occupant carrying a driver's license and being ready to perform manual driving is seated in the driver's seat.

The traffic information tuner 5 receives traffic information such as vehicle information and communication system ("VICS" which is a registered trademark) or traffic message channel (TMC). The traffic information tuner 5 outputs the received traffic information to the route setting unit 14.

The input unit 6 receives an operation performed by the occupant of the vehicle 1, and outputs the details of the received operation as operation information to the content information acquiring unit 11 and the route setting unit 14. The operation information output from the input unit 6 to the route setting unit 14 includes a destination or the like of the vehicle 1. The operation information output from the input unit 6 to the content information acquiring unit 11 includes content that the occupant desires to watch or listen to while the vehicle 1 is traveling (hereinafter referred to as "occupant-desired content") or the like. For example, when the occupant sets timer watching/listening for a program using an electronic program guide, the input unit 6 outputs the program for which timer watching/listening is set to the content information acquiring unit 11 as the occupant-desired content. The input unit 6 includes a touch panel, a controller, or the like. In a case where the input unit 6 is a touch panel, the touch panel may be integrated with a display that is the display unit 8.

On the basis of the route set by the route setting unit 14, the vehicle control unit 7 controls the vehicle 1 so that the vehicle 1 autonomously travels along the route. In the first embodiment, when the current position of the vehicle 1 is in the autonomous driving section, that is, on a road having the automation level 4 or higher, the vehicle control unit 7 controls the vehicle 1 so that the vehicle 1 autonomously travels. When the current position of the vehicle 1 is in the manual driving section and autonomous driving is possible, that is, when the current position is on a road having the automation level 3 and a driving operation by the occupant is unnecessary, the vehicle control unit 7 also controls the vehicle 1 so that the vehicle 1 autonomously travels along the route. Note that the vehicle control unit 7 may acquire information regarding the current position of the vehicle 1 from the GPS receiver 3 or the route setting unit 14.

The display unit 8 is a display that displays information from the notification unit 15.

The sound output unit 9 is a speaker that provides information from the notification unit 15.

The content information acquiring unit 11 acquires information indicating the occupant-desired content from the input unit 6. The content information acquiring unit 11 acquires, from the content receiving unit 2, content information of the occupant-desired content that the occupant of the vehicle 1 desires to watch or listen to. The content information of the occupant-desired content includes a title of the content, a watching-or-listening time period, and the like. The content information acquiring unit 11 outputs the acquired content information to the route setting unit 14.

The position information acquiring unit 12 acquires the position information of the vehicle 1 from the GPS receiver 3. The position information acquiring unit 12 outputs the acquired position information to the route setting unit 14.

The road information acquiring unit 13 acquires the road information including information regarding the autonomous driving section and the manual driving section from the map storage unit 4. The road information acquiring unit 13 outputs the acquired road information to the route setting unit 14. Note that the road information acquiring unit 13 may acquire not only the information regarding the autonomous driving section and the manual driving section but also the information regarding the available parking area.

When the map storage unit 4 is provided in an external server or the like, the road information acquiring unit 13 may acquire the road information from the map storage unit 4 provided in the external server or the like via a wireless communication device (not illustrated).

The route setting unit 14 acquires the content information from the content information acquiring unit 11, acquires the position information from the position information acquiring unit 12, and acquires the road information from the road information acquiring unit 13. The route setting unit 14 also acquires operation information indicating the destination of the vehicle 1 from the input unit 6. The route setting unit 14 searches for a route on which the vehicle 1 travels on the basis of the position information, the destination, and the road information. When doing so, the route setting unit 14 searches for a route in which the vehicle 1 travels through the autonomous driving section in the watching-or-listening time period of the occupant-desired content on the basis of the content information of the occupant-desired content. In addition, the route setting unit 14 may preferentially search for any route such as a route with a short travel time, a route with a short travel distance, or a route in which a toll road is preferentially selected. The input unit 6 may receive a setting indicating what kind of route is to be preferentially searched for from the occupant, and output the setting to the route setting unit 14.

In addition, the route setting unit 14 acquires traffic information from the traffic information tuner 5, and estimates a scheduled time of arrival at the destination when the vehicle travels along the route searched for, in consideration of the traffic information and the like. Similarly, the route setting unit 14 estimates scheduled times of arrival at an entrance and an exit of the autonomous driving section where the vehicle 1 is scheduled to travel in the watching-or-listening time period of the occupant-desired content in the route searched for. Since a known technique may be used as a method for estimating the scheduled time of arrival, the description thereof will be omitted.

The route setting unit 14 outputs the route searched for, each of the estimated scheduled times of arrival, and the content information of the occupant-desired content to the notification unit 15. The route setting unit 14 also outputs information indicating the route searched for, to the vehicle control unit 7.

Further, the route setting unit 14 searches for an available parking area around the current position of the vehicle 1 on the basis of the position information acquired from the position information acquiring unit 12 and the information regarding the available parking area included in the road information acquired from the road information acquiring unit 13. The route setting unit 14 outputs information indicating the available parking area searched for, to the notification unit 15. The use of the available parking area will be described in detail in FIG. 6.

The notification unit 15 acquires the route, the scheduled time of arrival at the destination, the scheduled times of arrival at the entrance and the exit of the autonomous driving section where the vehicle 1 is scheduled to travel in the watching-or-listening time period of the occupant-desired content, and the content information from the route setting unit 14, and notifies the occupant of the vehicle 1 of the acquired information. The notification is provided by at least either of display using the display unit 8 or sound output using the sound output unit 9. A specific example of the notification will be described later.

Note that the notification unit 15 may control the display unit 8 in such a manner that, when the vehicle 1 is traveling through the autonomous driving section, the display of the occupant-desired content received by the content receiving unit 2 on the display unit 8 is permitted, and when the vehicle 1 is traveling through the manual driving section, the display of the occupant-desired content received by the content receiving unit 2 on the display unit 8 is stopped.

Next, the operation of the in-vehicle information device 10 will be described.

Figure 2:
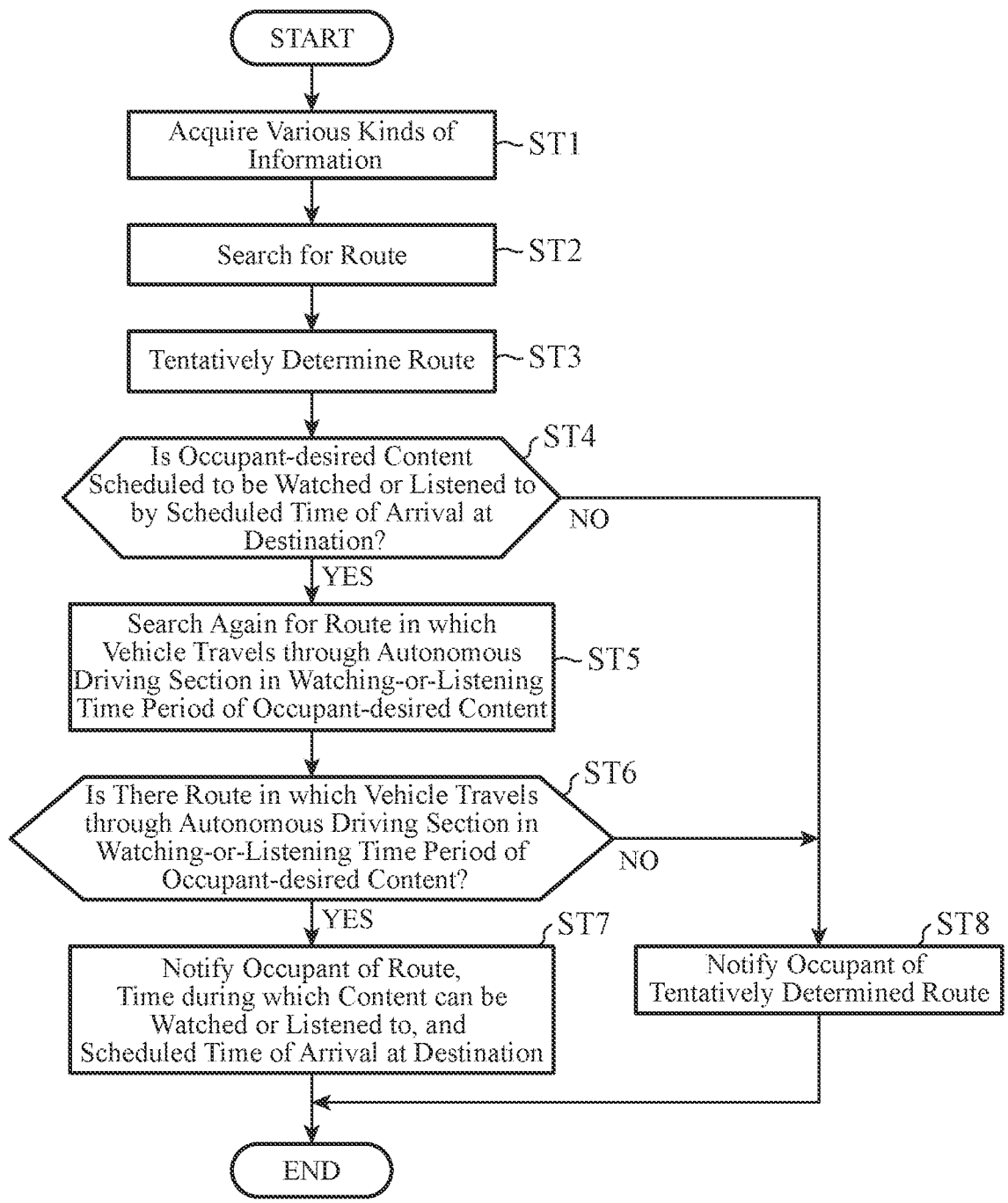
FIG. 2 is a flowchart illustrating an operation example of the in-vehicle information device according to the first embodiment.

FIG. 2 is a flowchart illustrating an operation example of the in-vehicle information device 10 according to the first embodiment. After the occupant gets into the vehicle 1, the in-vehicle information device 10 starts the operation illustrated in the flowchart of FIG. 2 before the vehicle 1 starts traveling.

In step ST1, the route setting unit 14 acquires the content information of the occupant-desired content from the content information acquiring unit 11, acquires the position information of the vehicle 1 from the position information acquiring unit 12, and acquires the road information from the road information acquiring unit 13. The route setting unit 14 also acquires operation information indicating a destination from the input unit 6. The departure place may be the current position of the vehicle 1, or the input unit 6 may receive the departure place from the occupant.

In step ST2, the route setting unit 14 searches for a route from the departure place to the destination using the various kinds of information acquired in step ST1. Note that, as described above, the route setting unit 14 may preferentially search for any route such as a route with a short travel time, a route with a short travel distance, or a route in which a toll road is preferentially selected.

In step ST3, the route setting unit 14 tentatively determines that the route searched for in step ST2 is a route on which the vehicle 1 is scheduled to travel.

In step ST4, the route setting unit 14 estimates a scheduled time of arrival at the destination for the route tentatively determined in step ST3. Then, the route setting unit 14 compares the estimated scheduled time of arrival at the destination with the watching-or-listening time period of the occupant-desired content, and thereby determines whether or not the occupant-desired content is scheduled to be watched or listened to by the scheduled time of arrival at the destination. Note that, when there is a plurality of tentatively determined routes, the route setting unit 14 estimates the scheduled time of arrival at the destination, and determines whether or not the occupant-desired content is scheduled to be watched or listened to by the scheduled time of arrival at the destination, for each route.

In a case where the occupant-desired content is scheduled to be watched or listened to by the scheduled time of arrival at the destination (step ST4 "YES"), the route setting unit 14 searches again for a route in which the vehicle travels through the autonomous driving section in the watching-or-listening time period of the occupant-desired content in step ST5. Note that the route setting unit 14 may search for a route in which the vehicle travels through the autonomous driving section over the entire watching-or-listening time period of the occupant-desired content, or a route in which the vehicle travels through the autonomous driving section over at least a part of the watching-or-listening time period of the occupant-desired content.

If a route in which the vehicle travels through the autonomous driving section in the watching-or-listening time period of the occupant-desired content is found by another search in step ST5 (step ST6 "YES"), the route setting unit 14 estimates scheduled times of arrival at the entrance and the exit of the autonomous driving section. The route setting unit 14 compares the estimated scheduled times of arrival at the entrance and the exit of the autonomous driving section with the watching-or-listening time period of the occupant-desired content, and thereby calculates a time during which the occupant-desired content can be watched or listened to. Then, the route setting unit 14 outputs, to the notification unit 15, information indicating the route in which the vehicle travels through the autonomous driving section in the watching-or-listening time period of the occupant-desired content, the time during which the occupant-desired content can be watched or listened to on the route, and the scheduled time of arrival at the destination. Note that, when there are multiple routes in which the vehicle travels through the autonomous driving section in the watching-or-listening time period of the occupant-desired content, the route setting unit 14 calculates a time during which the occupant-desired content can be watched or listened to for each route, and outputs, to the notification unit 15, information indicating the calculated times and the scheduled times of arrival at the destination.

In step ST7, the notification unit 15 receives, from the route setting unit 14, the information indicating the route in which the vehicle travels through the autonomous driving section in the watching-or-listening time period of the occupant-desired content, the time during which the occupant-desired content can be watched or listened to on the route, and the scheduled time of arrival at the destination. The notification unit 15 notifies the occupant of the vehicle 1 of the information acquired from the route setting unit 14. The notification is provided by at least either of display using the display unit 8 or sound output using the sound output unit 9. Thereafter, the route setting unit 14 sets, in the vehicle control unit 7, the route in which the vehicle travels through the autonomous driving section in the watching-or-listening time period of the occupant-desired content. The vehicle control unit 7 controls the vehicle 1 along the route set by the route setting unit 14. Note that, in a case where there are multiple routes in which the vehicle travels through the autonomous driving section in the watching-or-listening time period of the occupant-desired content, the route setting unit 14 may receive a route selected from the multiple routes by the occupant from the input unit 6 and set the selected route in the vehicle control unit 7.

If the occupant-desired content is not scheduled to be watched or listened to by the scheduled time of arrival at the destination (step ST4 "NO"), the route setting unit 14 outputs information indicating the route tentatively determined in step ST3 to the notification unit 15. In addition, in a case where there is no route in which the vehicle travels through the autonomous driving section in the watching-or-listening time period of the occupant-desired content (step ST6 "NO") as a result of another search in step ST5, the route setting unit 14 outputs information indicating the route tentatively determined in step ST3 to the notification unit 15.

In step ST8, the notification unit 15 acquires information indicating the tentatively determined route from the route setting unit 14. The notification unit 15 notifies the occupant of the vehicle 1 of the information indicating the route acquired from the route setting unit 14. The notification is provided by at least either of display using the display unit 8 or sound output using the sound output unit 9. Thereafter, the route setting unit 14 sets the route tentatively determined in step ST3, in the vehicle control unit 7. The vehicle control unit 7 controls the vehicle 1 along the route set by the route setting unit 14. Note that, in a case where there are multiple routes tentatively determined, the route setting unit 14 may receive a route selected from the multiple routes by the occupant from the input unit 6 and set the selected route in the vehicle control unit 7.

Next, a notification example by the notification unit 15 before the vehicle 1 starts traveling will be described.

Figure 3:
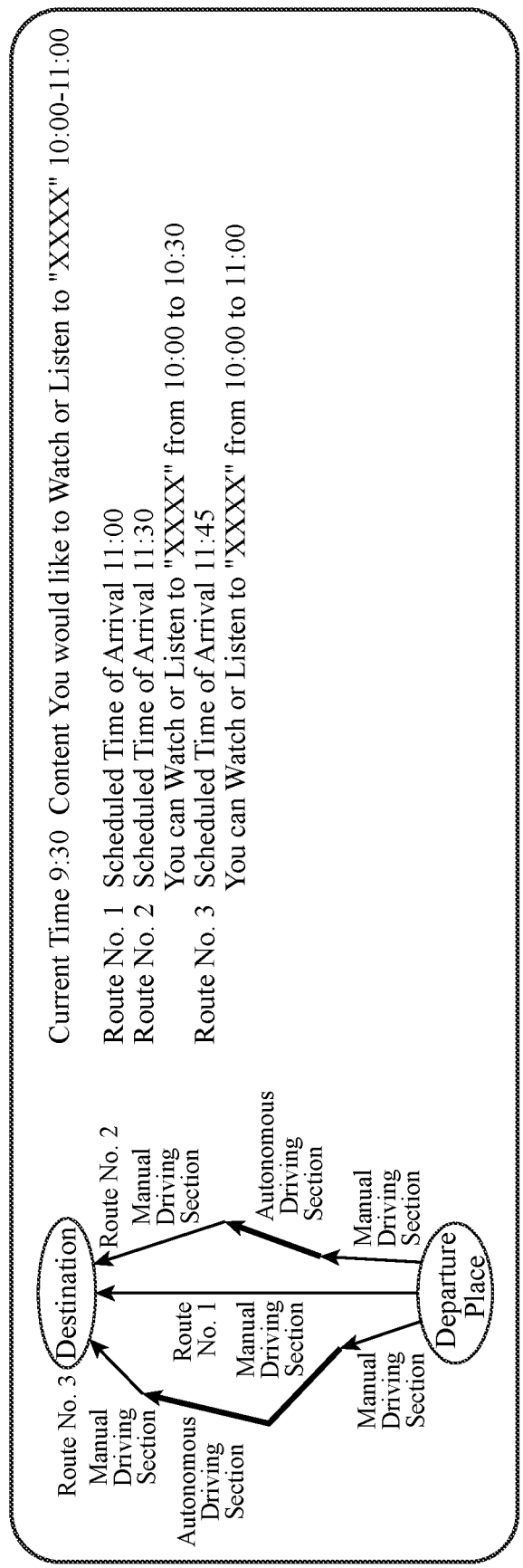
FIG. 3 is a diagram illustrating an example of a route selection screen displayed on a display unit by a notification unit according to the first embodiment.

FIG. 3 is a diagram illustrating an example of a route selection screen displayed on the display unit 8 by the notification unit 15 according to the first embodiment. In FIG. 3, it is assumed that a watching-or-listening time period of the occupant-desired content "XXXX" that the occupant of the vehicle 1 desires to watch or listen to is "10:00-11:00". "XXXX" is a title of the occupant-desired content. In a case where there is no route in which the vehicle travels through the autonomous driving section in the watching-or-listening time period of the occupant-desired content, the notification unit 15 displays, on the display unit 8, the route No. 1 in which the entire route is in the manual driving section from among the routes No. 1, No. 2, and No. 3 in FIG. 3 and "11:00" which is the scheduled time of arrival at the destination when the route No. 1 is selected (step ST8 in FIG. 2).

In a case where there are the route No. 2 and the route No. 3 in which the vehicle travels through the autonomous driving section in the watching-or-listening time period of the occupant-desired content, the notification unit 15 displays, on the display unit 8, the routes No. 2 and No. 3 among the routes No. 1, No. 2, and No. 3 in FIG. 3 (step ST7 in FIG. 2).

Specifically, the notification unit 15 displays, on the display unit 8, the route No. 2, "11:30" which is the scheduled time of arrival at the destination when the route No. 2 is selected, and "10:00-10:30" which is the time during which the occupant-desired content can be watched or listened to on the route No. 2. The time during which the occupant-desired content can be watched or listened to on the route No. 2 indicates a time in which the time period from the scheduled time of arrival at the entrance to the scheduled time of arrival at the exit of the autonomous driving section on the route No. 2 calculated by the route setting unit 14 overlaps with the watching-or-listening time period of the occupant-desired content.

Similarly, the notification unit 15 displays, on the display unit 8, the route No. 3, "11:45" which is the scheduled time of arrival at the destination when the route No. 3 is selected, and "10:00-11:00" which is the time during which the occupant-desired content can be watched or listened to on the route No. 3. The time during which the occupant-desired content can be watched or listened to on the route No. 3 indicates a time in which the time period from the scheduled time of arrival at the entrance to the scheduled time of arrival at the exit of the autonomous driving section on the route No. 3 calculated by the route setting unit 14 overlaps with the watching-or-listening time period of the occupant-desired content.

In the example of FIG. 3, the time during which the occupant-desired content can be watched or listened to corresponds to a proportion indicating how much of the watching-or-listening time period of the occupant-desired content is included in the time period over which the vehicle 1 travels through the autonomous driving section.

Next, a notification example by the notification unit 15 after the vehicle 1 starts traveling will be described.

Figure 4:
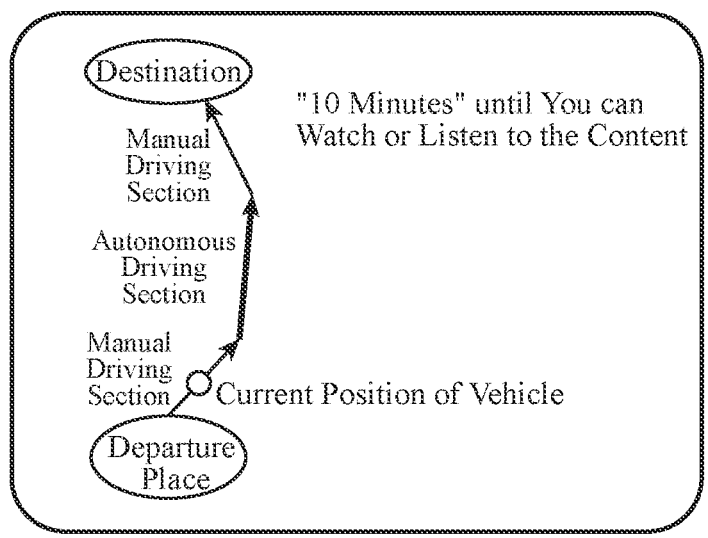
FIG. 4 is a diagram illustrating an example of a screen displayed on the display unit by the notification unit while a vehicle is traveling through a manual driving section in the first embodiment.
Figure 5:
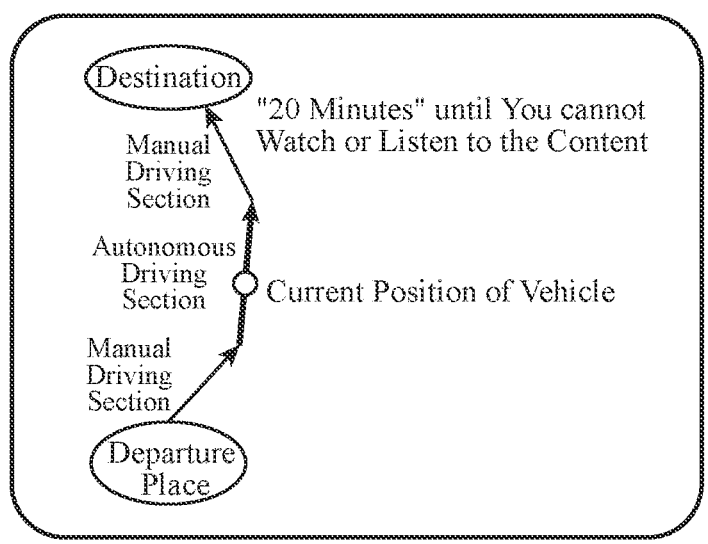
FIG. 5 is a diagram illustrating an example of a screen displayed on the display unit by the notification unit while the vehicle is traveling through an autonomous driving section in the first embodiment.

FIG. 4 is a diagram illustrating an example of a screen displayed on the display unit 8 by the notification unit 15 while the vehicle is traveling through the manual driving section in the first embodiment. FIG. 5 is a diagram illustrating an example of a screen displayed on the display unit 8 by the notification unit 15 while the vehicle is traveling through the autonomous driving section in the first embodiment.

The notification unit 15 acquires, from the route setting unit 14, the scheduled times of arrival at the entrance and the exit of the autonomous driving section, and information indicating the latest position of the vehicle. When the position of the vehicle is within the manual driving section, the notification unit 15 displays, on the display unit 8, the time until the vehicle arrives at the entrance of the autonomous driving section through which the vehicle 1 is scheduled to travel in the watching-or-listening time period of the occupant-desired content as illustrated in FIG. 4. In the example of FIG. 4, since the time from the current time to the scheduled time of arrival at the entrance of the autonomous driving section is "10 minutes", the notification unit 15 displays a message "'10 minutes' until you can watch or listen to the content" on the display unit 8. Note that the notification unit 15 may allow the sound output unit 9 to output by sound the message "'10 minutes' until you can watch or listen to the content".

On the other hand, when the position of the vehicle is within the autonomous driving section through which the vehicle 1 is scheduled to travel in the watching-or-listening time period of the occupant-desired content, the notification unit 15 displays, on the display unit 8, the time until the vehicle arrives at the exit of the autonomous driving section through which the vehicle is now traveling, as illustrated in FIG. 5. In the example of FIG. 5, since the time from the current time to the scheduled time of arrival at the exit of the autonomous driving section is "20 minutes", the notification unit 15 displays a message "'20 minutes' until you cannot watch or listen to the content" on the display unit 8. Note that the notification unit 15 may allow the sound output unit 9 to output by sound the message "'20 minutes' until you cannot watch or listen to the content".

Note that a case may occur in which the vehicle 1 does not reach the entrance of the autonomous driving section by the start time of the watching-or-listening time period of the occupant-desired content due to traffic conditions such as traffic congestion or traffic restriction. Therefore, in a case where the vehicle 1 does not arrive at the entrance of the autonomous driving section by the start time of the watching-or-listening time period of the occupant-desired content, and where a delay time from the start time of the watching-or-listening time period of the occupant-desired content to the time of arrival at the entrance of the autonomous driving section exceeds a predetermined time (for example, 30 minutes), the notification unit 15 may provide notification of the delay time.

FIG. 6 is a diagram illustrating an example of a screen displayed on the display unit 8 by the notification unit 15 when the arrival at the entrance of the autonomous driving section is delayed in the first embodiment. After the vehicle 1 starts traveling, the route setting unit 14 periodically acquires the traffic information from the traffic information tuner 5 and acquires the position information from the position information acquiring unit 12, and estimates the scheduled time of arrival at the entrance of the autonomous driving section using the acquired information. For example, in a case where the latest scheduled time of arrival at the entrance of the autonomous driving section estimated by the route setting unit 14 is delayed by 40 minutes from the start time of the watching-or-listening time period of the occupant-desired content, the notification unit 15 displays, on the display unit 8, a message indicating that "arrival at the content available area will be delayed by 40 minutes. You may not be able to watch or listen to the content you would like to watch or listen to" as illustrated in FIG. 6. Note that the notification unit 15 may allow the sound output unit 9 to output a sound message "arrival at the content available area will be delayed by 40 minutes. You may not be able to watch or listen to the content you would like to watch or listen to". The "content available area" refers to an autonomous driving section.

In addition, in a case where the vehicle 1 does not arrive at the entrance of the autonomous driving section by the start time of the watching-or-listening time period of the occupant-desired content, and where a delay time from the start time of the watching-or-listening time period of the occupant-desired content to the time of arrival at the entrance of the autonomous driving section exceeds a predetermined time (for example, 30 minutes), the notification unit 15 may display, on the display unit 8, options including "(1) continue driving along this route", "(2) search for nearby available parking areas", and "(3) search for another route".

When the occupant of the vehicle 1 performs operation of selecting "(1) continue driving along this route" on the input unit 6, the vehicle control unit 7 continues the control of the vehicle 1 so that the vehicle 1 travels along the currently set route. In a case where the start time of the occupant-desired content comes while the vehicle 1 is traveling through the manual driving section, the notification unit 15 may control the display unit 8 so that the display unit 8 does not display the occupant-desired content. In a case where the occupant selects the option (1), the occupant cannot watch or listen to the occupant-desired content at the start time of the watching-or-listening time period, but the arrival at the destination is not delayed because the vehicle 1 does not need to be stopped.

When the occupant of the vehicle 1 performs operation of selecting "(2) search for nearby available parking areas" on the input unit 6, the route setting unit 14 searches for available parking areas around the current position of the vehicle 1 on the basis of the road information. The notification unit 15 provides notification of an inquiry as to whether or not to stop the vehicle 1 in the available parking area searched for by the route setting unit 14 and watch or listen to the occupant-desired content. When the occupant selects the option (2), the arrival at the destination is delayed because the vehicle 1 stops, but the occupant can watch or listen to the occupant-desired content.

When the occupant of the vehicle 1 performs operation of selecting "(3) search for another route" on the input unit 6, the route setting unit 14 searches again for another route that provides an earlier scheduled time of arrival at the destination as compared with the currently set route. Alternatively, the route setting unit 14 searches again for another route that provides an earlier scheduled time of arrival at the entrance of the autonomous driving section in which the occupant-desired content can be watched or listened to, as compared with the currently set route. The notification unit 15 provides notification of guidance for urging switching to another route searched for by the route setting unit 14. In a case where the occupant selects the option (3), it is highly likely that the occupant can watch or listen to the occupant-desired content, as a result of switching to another route that provides an earlier scheduled time of arrival at the destination or the entrance of the autonomous driving section. In addition, since it is not necessary to stop the vehicle 1, the arrival at the destination is not delayed.

Lastly, a hardware configuration of the in-vehicle information device 10 according to the first embodiment will be described.

Figure 7:
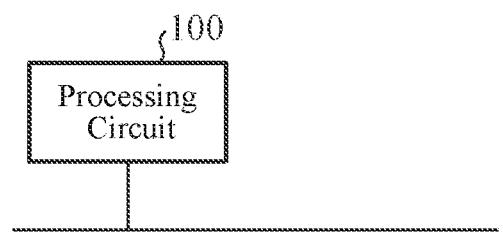
FIG. 7 is a diagram illustrating a hardware configuration example of the in-vehicle information device according to the first embodiment.
Figure 8:
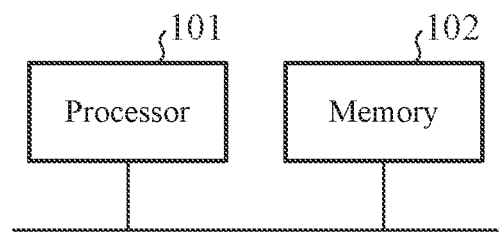
FIG. 8 is a diagram illustrating another hardware configuration example of the in-vehicle information device according to the first embodiment.

FIGS. 7 and 8 are diagrams each illustrating a hardware configuration example of the in-vehicle information device 10 according to the first embodiment. The functions of the content information acquiring unit 11, the position information acquiring unit 12, the road information acquiring unit 13, the route setting unit 14, and the notification unit 15 in the in-vehicle information device 10 are implemented by a processing circuit. That is, the in-vehicle information device 10 includes a processing circuit for implementing the above functions. The processing circuit may be a processing circuit 100 as dedicated hardware, or may be a processor 101 that executes a program stored in a memory 102.

When the processing circuit is dedicated hardware as shown in FIG. 7, the processing circuit 100 is, for example, a single circuit, a composite circuit, a programmed processor, a parallel programmed processor, an application specific integrated circuit (ASIC), a field programmable gate array (FPGA), or a combination of some of these circuits. The functions of the content information acquiring unit 11, the position information acquiring unit 12, the road information acquiring unit 13, the route setting unit 14, and the notification unit 15 may be implemented by a plurality of processing circuits 100, or may be collectively implemented by a single processing circuit 100.

When the processing circuit is the processor 101 as illustrated in FIG. 8, the functions of the content information acquiring unit 11, the position information acquiring unit 12, the road information acquiring unit 13, the route setting unit 14, and the notification unit 15 are implemented by software, firmware, or a combination of software and firmware. Each of software and firmware is described as a program and stored in the memory 102. The processor 101 implements the functions of the respective units by reading and executing the program stored in the memory 102. That is, the in-vehicle information device 10 includes the memory 102 for storing a program which, when executed by the processor 101, causes each step shown in the flowchart of FIG. 2 to be consequently performed. In addition, it can also be said that this program causes a computer to execute the procedures or methods performed by the content information acquiring unit 11, the position information acquiring unit 12, the road information acquiring unit 13, the route setting unit 14, and the notification unit 15.

Here, the processor 101 is, for example, a central processing unit (CPU), a processing device, a computing device, a microprocessor, or the like.

The memory 102 is, for example, a nonvolatile or volatile semiconductor memory such as a random access memory (RAM), a read only memory (ROM), an erasable programmable ROM (EPROM), or a flash memory, a magnetic disk such as a hard disk or a flexible disk, or an optical disc such as a compact disc (CD) or a digital versatile disc (DVD).

Note that a portion of the functions of the content information acquiring unit 11, the position information acquiring unit 12, the road information acquiring unit 13, the route setting unit 14, and the notification unit 15 may be implemented by dedicated hardware, and another portion may be implemented by software or firmware. As described above, the processing circuit of the in-vehicle information device 10 can implement the abovementioned functions by hardware, software, firmware, or a combination thereof.

As described above, the in-vehicle information device 10 according to the first embodiment includes the content information acquiring unit 11, the position information acquiring unit 12, the road information acquiring unit 13, the route setting unit 14, and the notification unit 15. The content information acquiring unit 11 acquires content information including a watching-or-listening time period of content that the occupant of the vehicle 1 desires to watch or listen to. The position information acquiring unit 12 acquires position information of the vehicle 1. The road information acquiring unit 13 acquires road information including information regarding an autonomous driving section and a manual driving section. The route setting unit 14 sets a route in which the vehicle travels through the autonomous driving section in the watching-or-listening time period of the content on the basis of the content information, the position information, and the road information. The notification unit 15 notifies the occupant of the vehicle 1 of the route set by the route setting unit 14. With this configuration, the in-vehicle information device 10 can search for a route in which the vehicle travels through the autonomous driving section in a time period over which the occupant seated in the driver's seat desires to watch or listen to content such as a television program, the autonomous driving section requiring no manual driving. Therefore, the occupant seated in the driver's seat does not need to prepare for switching from autonomous driving to manual driving, and thus can watch or listen to the content without worrying about driving.

Further, according to the first embodiment, the notification unit 15 may provide notification of a proportion indicating how much of the watching-or-listening time period of the content is included in a time period over which the vehicle 1 travels through the autonomous driving section. With this configuration, the notification unit 15 can allow the occupant to select the route in consideration of how long the content can be watched or listened to.

Further, according to the first embodiment, the notification unit 15 may provide notification of a time until the vehicle 1 arrives at the entrance of the autonomous driving section. With this configuration, the notification unit 15 can notify the occupant of how long it takes until the occupant can watch or listen to the content without worrying about driving.

Further, according to the first embodiment, the notification unit 15 may provide notification of a time until the vehicle 1 arrives at the exit of the autonomous driving section. With this configuration, the notification unit 15 can notify the occupant of how much time the occupant has before the occupant needs to stop watching or listening to the content and concentrate on driving.

In addition, according to the first embodiment, when the vehicle 1 does not arrive at the entrance of the autonomous driving section by the start time of the watching-or-listening time period of the content, and a delay time from the start time of the watching-or-listening time period of the content to the time of arrival at the entrance of the autonomous driving section exceeds a predetermined time, the notification unit 15 may provide notification of the delay time. With this configuration, the notification unit 15 can notify the occupant of a situation in which the occupant may not be able to watch or listen to the content because the arrival at the entrance of the autonomous driving section is delayed due to a traffic condition such as traffic congestion or traffic restriction.

In addition, according to the first embodiment, when the vehicle 1 does not arrive at the entrance of the autonomous driving section by the start time of the watching-or-listening time period of the content, and a delay time from the start time of the watching-or-listening time period of the content to the time of arrival at the entrance of the autonomous driving section exceeds a predetermined time, the notification unit 15 may provide notification of an inquiry as to whether or not to cause the vehicle 1 to continue traveling. When the occupant receiving this notification continues driving the vehicle 1, he or she cannot watch or listen to the occupant-desired content at the start time of the watching-or-listening time period, but can avoid late arrival at the destination because it is not necessary to stop the vehicle 1.

In addition, according to the first embodiment, when the vehicle 1 does not arrive at the entrance of the autonomous driving section by the start time of the watching-or-listening time period of the content, and a delay time from the start time of the watching-or-listening time period of the content to the time of arrival at the entrance of the autonomous driving section exceeds a predetermined time, the notification unit 15 may provide notification of an inquiry as to whether or not to stop the vehicle 1 and watch or listen to the content. When the occupant receiving this notification stops the vehicle 1, he or she can watch or listen to the occupant-desired content.

In addition, according to the first embodiment, when the vehicle 1 does not arrive at the entrance of the autonomous driving section by the start time of the watching-or-listening time period of the content, and a delay time from the start time of the watching-or-listening time period of the content to the time of arrival at the entrance of the autonomous driving section exceeds a predetermined time, the notification unit 15 may provide notification of guidance for urging switching to another route that provides an earlier time of arrival at the entrance of the autonomous driving section or another route that provides an earlier time of arrival at the destination. When the occupant receiving this notification switches to another route, the possibility that the occupant can watch or listen to the occupant-desired content can be increased, and late arrival at the destination can be prevented because it is not necessary to stop the vehicle 1.

It is to be noted that, in the present invention, any components in the embodiment can be modified or omitted within the scope of the invention.

INDUSTRIAL APPLICABILITY

The in-vehicle information device according to the present invention sets a route in consideration of the watching-or-listening time period of content that the occupant desires to watch or listen to. Thus, the in-vehicle information device is suitable for an in-vehicle information device or the like used for a self-driving vehicle that requires switching between autonomous driving and manual driving.

REFERENCE SIGNS LIST

1: vehicle, 2: content receiving unit, 3: GPS receiver, 4: map storage unit, 5: traffic information tuner, 6: input unit, 7: vehicle control unit, 8: display unit, 9: sound output unit, 10: in-vehicle information device, 11: content information acquiring unit, 12: position information acquiring unit, 13: road information acquiring unit, 14: route setting unit, 15: notification unit, 100: processing circuit, 101: processor, 102: memory

The invention claimed is:

1. An in-vehicle information device comprising:
processing circuitry
to acquire content information including a watching-or-listening time period of content that an occupant of a vehicle desires to watch or listen to;
to acquire position information of the vehicle;
to acquire road information including information regarding an autonomous driving section and a manual driving section;
to set a route on which the vehicle travels and in which the vehicle travels through the autonomous driving section in the watching-or-listening time period of the content, on a basis of the content information acquired by the content information acquiring unit, the position information acquired by the position information acquiring unit, and the road information acquired by the road information acquiring unit; and
to notify the occupant of the vehicle of the route set.

2. The in-vehicle information device according to claim 1, wherein the processing circuitry provides notification of a proportion indicating how much of the watching-or-listening time period of the content is included in a time period over which the vehicle travels through the autonomous driving section.

3. The in-vehicle information device according to claim 1, wherein the processing circuitry provides notification of a time until the vehicle arrives at an entrance of the autonomous driving section.

4. The in-vehicle information device according to claim 1, wherein the processing circuitry provides notification of a time until the vehicle arrives at an exit of the autonomous driving section.

5. The in-vehicle information device according to claim 1, wherein, when the vehicle does not arrive at an entrance of the autonomous driving section by a start time of the watching-or-listening time period of the content, and a delay time from the start time of the watching-or-listening time period of the content to a time of arrival at the entrance of the autonomous driving section exceeds a predetermined time, the processing circuitry provides notification of the delay time.

6. The in-vehicle information device according to claim 1, wherein, when the vehicle does not arrive at an entrance of the autonomous driving section by a start time of the watching-or-listening time period of the content, and a delay time from the start time of the watching-or-listening time period of the content to a time of arrival at the entrance of the autonomous driving section exceeds a predetermined time, the processing circuitry provides notification of an inquiry as to whether or not to cause the vehicle to continue traveling.

7. The in-vehicle information device according to claim 1, wherein, when the vehicle does not arrive at an entrance of the autonomous driving section by a start time of the watching-or-listening time period of the content, and a delay time from the start time of the watching-or-listening time period of the content to a time of arrival at the entrance of the autonomous driving section exceeds a predetermined time, the processing circuitry provides notification of an inquiry as to whether or not to stop the vehicle and watch or listen to the content.

8. The in-vehicle information device according to claim 1, wherein, when the vehicle does not arrive at an entrance of the autonomous driving section by a start time of the watching-or-listening time period of the content, and a delay time from the start time of the watching-or-listening time period of the content to a time of arrival at the entrance of the autonomous driving section exceeds a predetermined time, the processing circuitry provides notification of guidance for urging switching to another route that provides an earlier time of arrival at the entrance of the autonomous driving section or another route that provides an earlier time of arrival at a destination.

9. A method for controlling an in-vehicle information device, the method comprising:
- acquiring content information including a watching-or-listening time period of content that an occupant of a vehicle desires to watch or listen to;
- acquiring position information of the vehicle;
- acquiring road information including information regarding an autonomous driving section and a manual driving section;
- setting, a route on which the vehicle travels and in which the vehicle travels through the autonomous driving section in the watching-or-listening time period of the content, on a basis of the content information acquired, the position information acquired, and the road information acquired; and
- notifying the occupant of the vehicle of the route set.

* * * * *